United States Patent
Kaufer et al.

(10) Patent No.: US 11,263,558 B2
(45) Date of Patent: Mar. 1, 2022

(54) METHOD FOR MONITORING ACCESS TO ELECTRONICALLY CONTROLLABLE DEVICES

(71) Applicant: HUF HÜLSBECK & FÜRST GMBH & CO. KG, Velbert (DE)

(72) Inventors: Uwe Kaufer, Duisburg (DE); Sven Gennermann, Velbert (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 367 days.

(21) Appl. No.: 16/080,984

(22) PCT Filed: Jan. 16, 2017

(86) PCT No.: PCT/EP2017/050818
§ 371 (c)(1),
(2) Date: Aug. 29, 2018

(87) PCT Pub. No.: WO2017/153068
PCT Pub. Date: Sep. 14, 2017

(65) Prior Publication Data
US 2019/0087752 A1    Mar. 21, 2019

(30) Foreign Application Priority Data
Mar. 11, 2016   (DE) .................. 10 2016 104 530.6

(51) Int. Cl.
*H04L 9/00*   (2006.01)
*G06Q 10/02*   (2012.01)
(Continued)

(52) U.S. Cl.
CPC ............ *G06Q 10/02* (2013.01); *G07B 15/02* (2013.01); *G07C 9/00817* (2013.01);
(Continued)

(58) Field of Classification Search
USPC ........................................... 705/50
See application file for complete search history.

(56) References Cited

U.S. PATENT DOCUMENTS

| 7,681,246 | B1 * | 3/2010 | Chen | H04L 63/123 726/30 |
| 2002/0128953 | A1 * | 9/2002 | Quallen | G06Q 40/04 705/37 |

(Continued)

FOREIGN PATENT DOCUMENTS

| DE | 10 2011 078 018 A1 | 12/2012 |
| EP | 1024239 A1 | 8/2000 |

(Continued)

OTHER PUBLICATIONS

International Search Report of International Application No. PCT/EP2017/050818 dated Apr. 25, 2017, 6 pages.

(Continued)

*Primary Examiner* — Tonya Joseph
(74) *Attorney, Agent, or Firm* — Fay Sharpe LLP

(57) ABSTRACT

A method for monitoring access to an electronically controllable device includes establishing communication between a mobile device and a control platform via a communication network. A booking, including first and second data, is created for a controllable device in the platform. The first data is access information and the second data is encrypted with an individual key which is assigned to an access control unit in the controllable device. The mobile device is wirelessly connected to the access unit and the second data, as well as a subset of the first data, is transmitted to the access unit which decrypts the second data and checks its signature. If the check is successful, a configuration of the access unit is adapted as a function of the decrypted data. Authorization for access to the control- (Continued)

lable device by the mobile device is checked as a function of the decrypted data.

5 Claims, 1 Drawing Sheet

(51) Int. Cl.
    *G07C 9/00*      (2020.01)
    *G07B 15/02*      (2011.01)
    *G07C 9/27*      (2020.01)
    *H04L 29/06*      (2006.01)
    *H04W 12/10*      (2021.01)

(52) U.S. Cl.
    CPC ........... *G07C 9/00857* (2013.01); *G07C 9/27* (2020.01); *H04L 63/0428* (2013.01); *H04W 12/10* (2013.01); *G07C 2009/00841* (2013.01); *G07C 2009/00865* (2013.01)

(56) References Cited

U.S. PATENT DOCUMENTS

| | | | |
|---|---|---|---|
| 2005/0058149 A1* | 3/2005 | Howe | H04L 47/17 370/428 |
| 2007/0156470 A1* | 7/2007 | Granucci | G06Q 10/087 705/5 |
| 2008/0222421 A1* | 9/2008 | Nakayama | H04L 9/3247 713/176 |
| 2009/0251279 A1 | 10/2009 | Spangenberg et al. | |
| 2012/0164989 A1 | 6/2012 | Xiao et al. | |
| 2012/0221473 A1* | 8/2012 | Redmann | H04L 9/3263 705/50 |
| 2013/0259232 A1 | 10/2013 | Petel | |
| 2014/0032913 A1* | 1/2014 | Tenenboym | H04L 9/3247 713/176 |
| 2014/0049363 A1 | 2/2014 | Ahearn et al. | |
| 2014/0278608 A1* | 9/2014 | Johnson | G01S 19/51 705/5 |
| 2015/0143112 A1* | 5/2015 | Yavuz | H04L 9/00 713/165 |

FOREIGN PATENT DOCUMENTS

| | | |
|---|---|---|
| EP | 1 562 153 A2 | 8/2005 |
| EP | 1 910 134 B1 | 5/2013 |
| EP | 2 821 972 A1 | 1/2015 |
| FR | 2 826 394 A1 | 12/2002 |
| WO | WO 2007/009453 A2 | 1/2007 |
| WO | WO 2011/053357 A1 | 5/2011 |

OTHER PUBLICATIONS

International Preliminary Report on Patentability/Written Opinion of International Application No. PCT/EP2017/050818 dated Sep. 11, 2018 (and English Translation), 18 pages.

* cited by examiner

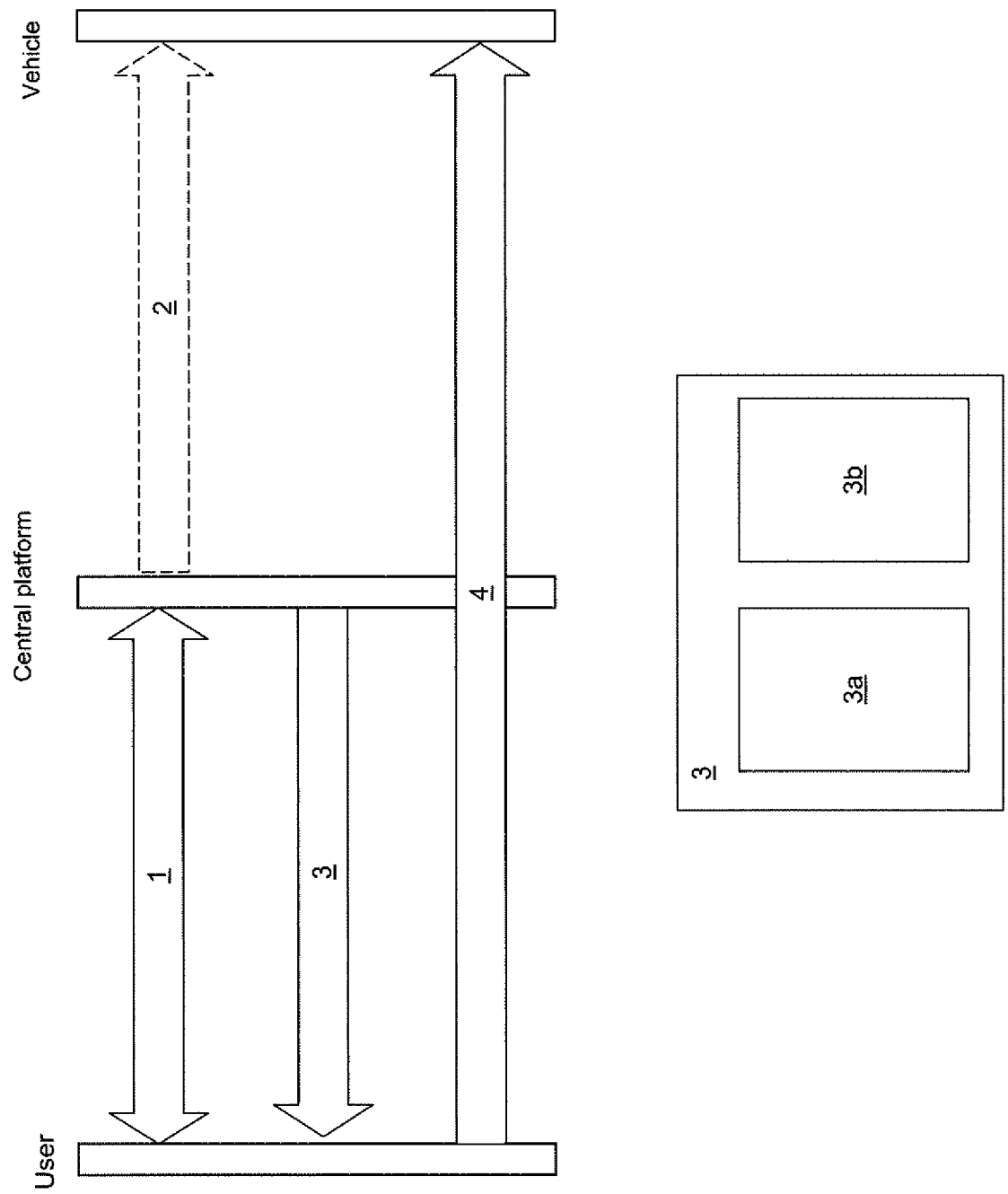

METHOD FOR MONITORING ACCESS TO ELECTRONICALLY CONTROLLABLE DEVICES

BACKGROUND

The invention relates to a system and a method for monitoring user accesses to electronically controllable devices, in particular vehicles. The invention relates in particular to a system and a method in which access privileges to electronically controllable devices may be distributed to individuals and managed.

Management of access rights or user rights is very common in the technology field. For example, there are complex rights, hierarchies and formulas in the management of access privileges in computer systems. In these, an individual who identifies himself to the computer system, for example using a confidential identifier or biometric data, is granted access to services or files in the computer system. If the assigned rights or privileges are not sufficient to perform a requested action, however, this action is denied using technical measures.

In locking systems for motor vehicles and buildings, for access monitoring, frequently a locking means is identified in order to check access to a function, for example access to the vehicle or the building. Here it is assumed that the bearer of the locking means is also the person authorized to request the specific function. Similar concepts are found in particular in the field of vehicle locking systems, in particular keyless entry and keyless go systems. In this case, a user carries a vehicle key designated as an ID provider. This ID provider contains coded information that authenticates for the vehicle the authorization of the ID provider (not necessarily the bearer of the ID provider) for executing functions. Thus, if the ID provider is given to another user, the other user is also able to use the ID provider to call up and actuate the vehicle functions.

In the field of access systems for vehicles, numerous different management systems are known for permitting access to vehicles. For example, US 2013/0259232 A1 describes a system for coupling or pairing a mobile telephone to a vehicle in order to be able to control vehicle functions with the mobile telephone.

DE 10 2011 078 018 A1 describes another system for executing vehicle functions, wherein a telecommunication center executes some of the communication with the vehicle.

US 2012/0164989 relates to another method and system for a wireless locking function for a vehicle.

EP 1 910 134 B1 describes a system having a central management unit that distributes data packets, as keys, to mobile communication devices.

WO 2007/009453 A2 discloses a rights management method that uses a central server for managing rights.

In known systems and methods for vehicle management and rental, a central control platform assumes the central rights management and control function. The central control platform is operated by a lessor or other manager of a vehicle pool and is equipped with information on privileges (rights) of identified users. This central control platform may be realized, for example, using a data base connected to a data network. A communication connection from remote sites to the central control platform may be established via the data network (internet, mobile network, etc.).

On the vehicle side, a second component, in the form of a technical access control unit, is provided for the vehicle for which access or the privileges granted are to be regulated; this second component may limit or release access to functions of the physical unit. Thus, for example, in the case of a vehicle, an access control unit is connected to the vehicle system such that the access control unit may intentionally release or deny locking functions or starting the engine or other functions. This device may be connected to communication means for wireless communication in order to connect to the central control platform and exchange data. These communication means comprise devices that permit a wireless connection via existing communication networks, especially via mobile networks. But this connection is not always possible, especially due to poor conditions for establishing communications. Since the invention does not depend on this option for connection, it will not be further discussed in the following.

Provided as an additional component of the system and method is a mobile communication device as a part of the system, which mobile communication device itself can communicate both with the central control platform and with the access control unit on the electronically controllable device (e.g. a vehicle) in order to exchange information. This mobile communication device may be realized in a smartphone. The mobile communication device is provided with associated application software that communicates with the central control platform and permits user interaction. A communications connection may likewise also be established between the mobile access device and the access control unit of the electronically controllable device. This occurs, for example, using a wireless connection according to a wireless network standard, by means of a Bluetooth interface, or via near field communication, e.g. an NFC interface.

With respect to communication and data transport in such an access method, a relationship is constructed in which on the one hand the central control platform can communicate with the mobile access device and on the other hand the mobile communication device can connect with the access control device to exchange data. The user interacts with the mobile access device.

In the context of renting a vehicle from a pool of rental vehicles, for example, granting access is accomplished as follows: Under the control of the user, the mobile communication device may establish data communication with the central control platform. This occurs, e.g. when an application from a car rental company is retrieved on the mobile access device of the user. Information that permits authentication of the access control unit to a physical unit are made available, by the central control platform, to the mobile access device in a dialog. This information may be, e.g. a certificate that is issued and signed by the central control platform.

If a booking is made in the central platform, this is confirmed to the mobile access device in a reply. In addition, the central control platform establishes contact with the access control unit of the booked vehicle via a separate connection and stores the booking there in the configuration.

Thus the mobile communication device and the access control unit are prepared for one another. A user may then authenticate himself with his mobile access device to the appropriate access control unit, which in its own data set uses the data obtained from the central platform to cross-check the booking.

The intervention by the central platform ensures that both components, that is, the mobile communication device and the access control unit of the vehicle, obtain the booking data directly from the central platform. Good security is assured since the central control platform is trustworthy.

However, some of the known systems and methods of this type, which facilitate access to technical, electronically controllable devices, have drawbacks. Thus, especially in the systems having a central database for rights management, it is necessary for the managed devices to which access is to be granted or denied to be able to be reached via wireless connections. This is not always assured, e.g. if a vehicle is parked in a garage having limited reception or if a managed device does not have a coupling with a data transport network available at all times.

The object of the invention is to provide a secure and flexible system and method in order to permit management of privileges for access to electronically controllable units, in particular vehicles at all times.

BRIEF SUMMARY

This object is attained using a method having the features of patent claim 1.

According to the invention, it is not only the data specified for the mobile access device regarding a booking that has been made that are transmitted by the central platform. These data may be read in the mobile access device and transmitted to the access control device when the user connects the mobile access device to the access control device of the electronically controllable device (e.g. a vehicle). According to the invention, the central control platform also transmits to the mobile communication device a data container that is signed and optionally encrypted and that may not be modified in the mobile access device.

According to the invention, the central control platform provides a signature of the data container or of the data in the container so that the access control unit can verify the integrity and origin of the data in the data container. Manipulation of the data on the way between central control platform and access control device is thus prevented. The signature is checked by the central control platform using stored certificates in the access control unit. The access control unit also has stored certificates. These were stored in a secure environment, e.g., with the manufacturer or manager. This concept is known, e.g. from Internet browsers that add information for verifying the certificates from numerous certification sites when the browsers are installed. It is therefore technically nearly impossible to modify the data, and both the security and the integrity of data, as well as their origin from the authorized central control platform, is assured.

The data in the container may be encrypted in particular with symmetrical or asymmetrical encryption, wherein only the central control platform and the access control unit on the electronically controllable device have the required keys. Encryption occurs in particular with an individual key of the access control device in question. The decryption is then possible exclusively in the addressed access control device for which the central control platform conducted the encryption.

In particular the data container may be encrypted with one of the public keys of the access control unit so that the latter may decode the data container after receipt with a stored private key.

According to the invention, the mobile communication device is used for this data container as a transport medium, without the transport medium having access to the contents of the container. The reason for this measure is that access rights, booking information, and other information on the configuration of the access control device that the access control device would otherwise obtain directly from the central platform are transportable in the inaccessible data container. If this direct receipt is not possible, however, e.g., because the electronically controllable device is not connected to a data transmission network, or, if the electronically controllable device is a vehicle, because the vehicle is parked at a location inaccessible for communication, the mobile communication device brings the required data along with it in the protected container. The protected container may contain configuration data, but also program updates, as well.

As soon as the mobile communication device is connected to the access control unit of the electronically controllable device, the container may be transmitted to the access control unit. There the container is decrypted, verified, and processed. In this process, e.g., the stored user rights are updated in the access control unit. Then the authorization of the user who is connected by the mobile access device to the access control unit, may be verified.

This process may proceed in a manner completely transparent for a user. The user books the use of a vehicle, e.g. using an application from a car rental company. This occurs using communication between the application on the mobile access device and the central platform. Once the booking has been checked and a specific vehicle has been allocated, the central control platform checks whether the vehicle can be reached via a mobile network. If the vehicle can be reached, the booking information is transmitted. If the vehicle cannot be reached, however, the central control platform packs the booking information into a data container that is encrypted with an individual key from the vehicle's access control unit and signs it. This data container is transmitted back to the mobile communication device of the user, together with the booking confirmation and readable booking information.

The user now goes with his mobile access device to the vehicle and initiates an opening dialog. If there is no booking information in the access control unit, however, because until this point in time it has not been possible to update the booking information by connecting to the central platform, the encrypted container is transmitted in the opening dialog. This encrypted container is decrypted in the vehicle's access control unit, where the private key for decoding is stored.

The signature of the container or the data stored therein by the central control platform is checked, as explained above, using the stored certificates. To this end, the access control unit has stored certificates. Following a successful check of the certificate, the booking information is retrieved and stored in the system. Opening authorization for the user may then be verified.

What is essential is that at no time is access provided to the contents of the data container in the mobile access device, or these contents are at least not modifiable without destroying the signature. The container is used solely for data transport. Because of this, the configuration may be updated and the access control device may be programmed even without a direct connection between the central platform and the access control device. Thus it is possible to book vehicles that the central control platform cannot reach.

The inventive method may be used not only for vehicles, but in general for electronically controllable physical devices. These may also include, e.g. access systems for buildings or locking systems of other vehicles. Then it is possible to update access systems with reduced connection to data transport networks via the mobile access means of users.

In one preferred embodiment of the invention, all of the information for updating the information for the access control device is packed into the protected data container by the central platform. This means that a complete set of data is transmitted to a user's mobile communication device for updating the access control device when a booking is made on the central platform. For an incoming booking, the central control platform checks when the most recent direct contact with the vehicle in question occurred. Then all of the booking information and configuration data that have not yet been transmitted to the vehicle (e.g. cancellations, etc.) are packed into the protected data container so that the user, with his mobile access device, conducts a complete update of the vehicle as soon as he connects to the access control device of the vehicle. In this way, the access control device obtains a complete, up-to-date set of rights for the bookings at hand.

Here it is particularly advantageous when the container also contains a time stamp so that on transmission to the access control device and after decryption it may be determined whether a decrypted data update is more up-to-date than an update already installed. This makes sense if updates were transmitted, e.g., to a plurality of booking users.

Alternatively or in addition, numbering that provides information about the chronological compilation of the data may be included in the data container. With this, a check may also be conducted in the access control unit of whether stored data are current or whether the data should be drawn from the container for updating. In addition, such numbering may prevent inadvertent or malicious repeated passing on of the data for a container that has already been used or expired. The numbering is stored in the access control unit so that a container that has already been accepted is not accepted another time.

In one embodiment of the invention, after a vehicle has been booked by the central platform, there is an attempt to establish contact with the mobile access device if something in the booking information for the booked vehicle changes. Thus, if a user books a vehicle for the following day, e.g. after a few hours the data container may be updated, e.g. in order to transmit to the vehicle additional bookings for the following days, by the central platform communicating with an application on the mobile access device.

The described inventive concept may in principle replace direct data transmission from the central platform to the access control device. However, it may also complement methods that in operation initially provide direct transmission and in the case of failure provide an alternative transmission via encrypted transport on the device of a user.

In the framework of the invention it is also possible to transport data in the opposing direction, as well, that is, from the access control device to the central control platform. In this case, the mobile access device is also used as a transport system for the data, wherein the signature and optionally encryption are performed in the access control device and the verification of the signature and any decryption takes place in the central control platform.

BRIEF DESCRIPTION OF THE DRAWINGS

The invention shall now be explained using the enclosed figures.

FIG. 1 is a schematic depiction of the information flow between a user, a central management platform, and a vehicle for using one embodiment of the inventive method.

DETAILED DESCRIPTION

FIG. 1 illustrates the three stations used in the inventive method as vertical bars.

The vertical bar on the left symbolizes a user who operates a smartphone as a mobile communication device. The center vertical bar stands for the central control platform that is a central data base of a vendor of rental cars and is connected to the internet. The central data base manages vehicle use rights and authorization information, as well as vehicle data. An application that is issued and authorized by the operator of the central platform is installed on the smartphone of the user. This application is embodied for communicating with the central platform.

The application on the smartphone of the user offers a graphic user interface so that the user may make inputs and bookings in the vehicle fleet of the operator of the central platform in a convenient manner. In addition, other functions, such as for example the recording and comparison of biometric data for checking a use authorization, may be provided in the application.

The vertical bar on the right represents the vehicle with its access control device. The access control device may be embodied in the vehicle, during vehicle construction, as an integral component of the control system. It may also be a retrofitted access control device, however, that is connected to the vehicle control system.

Via the application on his smartphone, the user connects to the central platform, which is indicated by the arrow 1. Here the user is offered various vehicles for rent. The user selects a vehicle to be rented at an input point in time and for a given period of use. The user may also have to enter additional identifying personal data into the application for transmission to the central control platform, and may also have to enter biometric data such as a fingerprint or facial image. The user and his access rights are stored in the central platform using a previous registration process. The set-up of a user in the central platform is not the subject-matter of the invention and is also not relevant for the present invention. Reliable locations and persons for a one-time immediate check of the user and the set-up in the central system are regularly provided for this purpose.

The central control platform verifies the data obtained in the communication 1. The fundamental authorization of the user for renting the specific vehicle is checked at the given point in time. If this check is successful, the central control platform attempts to connect to the vehicle (arrow 2) in order to store in its access control device the rental data and the authorization for the user. This arrow is illustrated with broken lines in the FIGURE because the vehicle is disposed at a location that does not permit any mobile communication. The central control platform thus may not store the updated booking data in the access control device of the vehicle.

Then, in the central platform, the configuration data for the access control device on the user's booking are packed into a data container that is encrypted with a key of the vehicle's access control device known to the central platform. In this context, it should be made clear that this key of the access control device is only public for the central platform. The concept of asymmetric encryption may be used. What is essential in this exemplary embodiment is that the encryption is always selected such that the data container remains inaccessible on the user's smartphone. Correspondingly, the keys are only used for the purpose of encrypting data traffic between the vehicle's access control device and the central platform, and not for data traffic between mobile telephone and access control device or between mobile telephone and central platform. The required keys were stored in the central platform when the vehicle was equipped with the access control device.

In addition, the data container 3b is signed by the central platform, wherein corresponding certificates that are managed by the central platform and that are for checking the signature are stored in the access control units.

The encrypted and signed data container 3b, together with the readable data 3a, are transmitted to the user in a joint message 3. The user thus obtains a data packet in which are found a readable data portion, in particular a booking confirmation and characterizing data for identifying the booking to the access control device. In addition, the data container 3b that is stored in a memory region of the application on the user's smartphone and remains encrypted, and unreadable, has been transmitted. It is not possible for the contents of the message 3b to be inspected or manipulated, since the user and the smartphone do not have the key for the vehicle's access control device.

This transmission of the encrypted data container 3b may occur in a manner completely transparent to the user, since this container normally has only a small volume of data. Additional future bookings for the same vehicle may also be stored in the encrypted container 3b, in addition to the user's booking.

The user now moves to the vehicle, that is, to the region in which no further communication with the central platform is possible. However, since he can approach the vehicle, but not the central platform, he can establish a communication connection, in particular a Bluetooth connection, to the vehicle's access control device and initiate communication. The data from the data packets 3a, and 3b are transmitted to the vehicle, more precisely to its access control device, with the message 4. The readable data 3a identify the booking about which the vehicle has not yet been informed, since the message 2 could not reach it.

The access control device checks the signature of the container received. This is accomplished using stored certificate information. This information is stored in the access control device during manufacture of the vehicle or at a later point in time in a secure environment. The idea of checking a certificate is already adequately known in technology, e.g. in the field of Internet browsers. If the integrity or origin of the container cannot be verified successfully, the container is discarded. Access to the vehicle is then only possible with the data already previously stored in the access control unit.

Once there has been a successful check of the signature, the latter then uses the stored key to unlock the data container 3b that contains the updated booking data. These data are stored in the access control device in the associated memory in which the vehicle booking data are stored such that they may be retrieved. Then the current booking is again verified using the readable data 3a, for instance a booking identification number. The booking may now be verified and the user is granted access to the vehicle.

The data container 3b may also contain other booking data or other cancellation data and even programming data that may be recognized as authentic by the access control device in the vehicle. The access control device in the vehicle is only permitted to be reprogrammed if the data have been decrypted with a key that fits the vehicle's control device, and even then only when these data were signed by the central platform.

The inventive method makes it possible to update booking data in vehicle access control devices, even if said vehicles are not accessible to the central platform for communicating via a communications network. Configuration data or data for programming the access control device are transported via a mobile device that is used exclusively as the transport medium, without access to the stored data.

The invention claimed is:

1. A method for monitoring access to an electronically controllable device, having the following steps:
    establishing a communication connection between a mobile communication device and a central control platform via a communication network,
    creating a booking for an electronically controllable device in the central control platform and transmitting first data on the booking from the central control platform to the mobile communication device, wherein the first data are embodied as access information for an access to the electronically controllable device and for processing in the mobile communication device,
    transmitting second data from the central control platform to the mobile communication device as a data container, wherein the second data are signed with a signature in the central control platform and encrypted with an individual key prior to the transmission, wherein the individual key is assigned to an access control unit in the electronically controllable device and wherein the encrypted second data are stored in the mobile communication device, wherein contents of the data container are not modifiable in the mobile communication device, and wherein at no time is access provided to the contents of the data container in the mobile communication device, or the contents are not modifiable without destroying the signature,
    wirelessly connecting the mobile communication device to the access control unit of the electronically controllable device for access to the electronically controllable device, wherein at least the second data and at least a subset of the first data are transmitted to the access control unit,
    wherein the access control unit decrypts the second data and checks the signature of the second data and, if the check is successful, a configuration of the access control unit is adapted as a function of the decrypted data, wherein the configuration of the access control unit is updated and the access control unit is programmed without a direct connection between the central control platform and the access control unit, and
    wherein an authorization for access to the electronically controllable device by the mobile communication device is checked as a function of the decrypted data.

2. The method according to claim 1, wherein the electronically controllable device is a vehicle.

3. The method according to claim 1, wherein, encrypted in the second data, in addition to the first data on the booking sent from the central control platform to the mobile communication device, is information on additional booking processes for the same electronically controllable device.

4. The method according to claim 1, wherein the second data comprise a time stamp of a time of encryption and wherein a current configuration of the access control unit is not updated unless the time stamp indicates that the encrypted data are more up-to-date than the current configuration of the access control unit.

5. The method according to claim 1, wherein, after creating the booking and prior to the access to the electronically controllable device, the central control platform, using the mobile communication device, establishes a connection to the mobile communication device and replaces the encrypted second data with updated encrypted second data.

* * * * *